United States Patent
Nakanishi et al.

(10) Patent No.: US 7,891,217 B2
(45) Date of Patent: Feb. 22, 2011

(54) METHOD OF PRODUCING AN OPTICAL FIBER PREFORM

(75) Inventors: Tetsuya Nakanishi, Yokohama (JP); Masaaki Hirano, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 376 days.

(21) Appl. No.: 11/665,600

(22) PCT Filed: Oct. 20, 2005

(86) PCT No.: PCT/JP2005/019279

§ 371 (c)(1), (2), (4) Date: Apr. 18, 2007

(87) PCT Pub. No.: WO2006/046458

PCT Pub. Date: May 4, 2006

(65) Prior Publication Data

US 2007/0283721 A1    Dec. 13, 2007

(30) Foreign Application Priority Data

Oct. 29, 2004    (JP)    ............................. 2004-315900

(51) Int. Cl.
C03B 37/01    (2006.01)
C03B 37/012    (2006.01)
C03B 37/014    (2006.01)
C03B 37/018    (2006.01)

(52) U.S. Cl. .......................................... 65/418; 65/417

(58) Field of Classification Search ................... 65/417, 65/418, 419

See application file for complete search history.

(56) References Cited

U.S. PATENT DOCUMENTS 4,149,867 A * 4/1979 Akamatsu et al. ............. 65/417

(Continued)

FOREIGN PATENT DOCUMENTS

CN    1526672 A    9/2004

(Continued)

OTHER PUBLICATIONS

Japanese Notification of Reasons for Rejection, w/ English translation thereof, issued in Japanese Patent Application No. JP 2004-315900 dated Dec. 1, 2009.

(Continued)

*Primary Examiner*—Khanh Nguyen
*Assistant Examiner*—Carson Gross
(74) *Attorney, Agent, or Firm*—McDermott Will & Emery LLP

(57) ABSTRACT

Glass can be synthesized and deposited at a high rate by the inside CVD method using a plasma burner in a manner such that unconsolidated portions or bubbles are little generated. The method includes a step of depositing a glass film on the inner wall surface of a starting pipe. In a first aspect, temperature the pipe is controlled not to exceed $(1800 + 100xd)°$ C., a temperature of $(1100 + 100xd)°$ C. or higher being continued for 20 seconds or more at each point of the pipe, where d (mm) represents the wall thickness of the pipe. In a second aspect, the burner includes at least two inlets and has an inner diameter of 80 mm or more, and the deposition step is performed in the relationship, 150 mm/s <(Total flow rate of the gases introduced into the burner)/(Sectional area of the burner) <600 mm/s.

3 Claims, 5 Drawing Sheets

U.S. PATENT DOCUMENTS

| | | | | |
|---|---|---|---|---|
| 4,563,276 | A | * | 1/1986 | Clark et al. .............. 210/198.2 |
| 5,000,771 | A | * | 3/1991 | Fleming et al. ............... 65/391 |
| 5,397,372 | A | * | 3/1995 | Partus et al. .................. 65/391 |
| 5,680,014 | A | * | 10/1997 | Miyamoto et al. ..... 315/111.41 |
| 2003/0115909 | A1 | * | 6/2003 | House et al. .................. 65/391 |

FOREIGN PATENT DOCUMENTS

| | | |
|---|---|---|
| EP | 1 454 889 | 9/2004 |
| JP | 7-196326 | 8/1995 |
| JP | 7-206462 | 8/1995 |
| JP | 7-307199 | 11/1995 |
| JP | 8-195295 | 7/1996 |
| JP | 2004-284944 | 10/2004 |

OTHER PUBLICATIONS

Chinese Office Action, w/ English translation thereof, issued in Chinese Patent Application No. CN 2005800375957 dated Nov. 20, 2009.

* cited by examiner

METHOD OF PRODUCING AN OPTICAL FIBER PREFORM

RELATED APPLICATIONS

This application is a national phase of PCT/JP2005/019279 filed Oct. 20, 2005, which claims priority from Japanese Application No. 2004-315900 filed Oct. 29, 2004, the disclosures of which Applications are incorporated by reference herein. The benefit of the filing and priority dates of the International and Japanese Applications is respectfully requested.

TECHNICAL FIELD

The present invention relates to a method of manufacturing an optical fiber preform by an inside chemical vapor deposition (CVD) method using a plasma burner.

BACKGROUND ART

An inside CVD method is a method in which glass particles of silica or the like are deposited on the inner wall surface of a starting pipe composed of silica based glass and the deposited glass particles are vitrified to produce an optical fiber preform. The glass particles are synthesized by introducing a gas of a glass raw material, such as silicon tetrachloride ($SiCl_4$), germanium tetrachloride ($GeCl_4$), or the like, into the starting pipe together with an oxygen gas, and then heating the pipe to a high temperature of about 1600° C. so that the raw material gas is subjected to oxidization reaction. In the inside CVD method, a gas burner using a mixed gas of hydrogen gas ($H_2$) and oxygen gas ($O_2$) or a mixed gas of propane ($C_3H_8$) and $O_2$ has conventionally been used as a heat source. However, the use of such gas burner has been disadvantageous since hydrogen molecules and hydroxyl groups (OH groups) tend to diffuse into a glass body to be processed, entering from the surface thereof, thereby causing a degradation in the transmission loss of an optical fiber produced from the glass body.

It has been proposed that a plasma burner that does not use hydrogen is adopted as a heat source for heating a glass body. Such a plasma burner is structured such that the cylindrical main body thereof, which is made of silica glass, for example, is inserted into the center of a coil to which a radio-frequency current is supplied. A plasma flame can be generated according to the size of the main body of the burner by introducing argon (Ar) or air thereinto. In Japanese Patent No. 2818735, a method is proposed in which an optical fiber preform for a fiber optic product little containing impurities such as hydrogen molecules and OH groups can be produced using a plasma burner in the inside CVD method. The contamination of a glass body with impurities such as hydrogen molecules, OH groups, and the like, can be significantly decreased by using the plasma burner as compared with the case of using a gas burner.

However, a starting pipe is liable to reach a high temperature in the use of a plasma burner as compared with the case of using a gas burner, since the a plasma fireball has a temperature of several thousands degrees to ten and several thousands degrees When a glass film containing Ge is deposited by the inside CVD method, it is required to maintain the maximum heating temperature low so that the occurrence of bubbles due to the generation of GeO may be suppressed. On the other hand, when a glass film is deposited at a rate of, for example, 1.3 g/min or more from the viewpoint of improvement in productivity, a heating width must be made broader for accomplishing the complete consolidation of the glass film. A drawback of using a conventional plasma burner is that when the deposition of a glass film is conducted at a rate of 1.3 g/min or more, an unconsolidated portion or a bubble tends to occur since widening the heating width of the starting pipe is difficult without increasing the maximum temperature.

A conceivable method for widening the heating width is to increase the nozzle diameter of a plasma burner. For example, as disclosed in Japanese Patent Application Laid open No. H8-195295, the nozzle diameter of a plasma burner can be increased if a conductive material such as carbon is placed inside the burner. However, such a type of plasma burner in which a carbon rod or the like is placed inside is unsuitable as a heat source for producing an optical fiber preform since it has shortcomings such that an optical fiber preform is contaminated with impurities or the heating width changes with an elapse of time, or the like. The heating width can also be widened using an inductive plasma generator disclosed in Japanese Patent Application Laid open No. H7-307199. However, the central temperature of the burner increases since the skin effect decreases as a result of the inductive plasma generator using a low frequency as an ignition source of inductive plasma. Also, the plasma temperature increases since Ar gas is used as a gas to be flowed into the burner. Therefore, the inductive plasma generator is unsuitable as a heat source of the inside CVD method.

Patent Document 1: U.S. Pat. No. 2,818,735
Patent Document 2: Japanese Patent Application Laid open No. H8-195295
Patent Document 3: Japanese Patent Application Laid open No. H7-307199

DISCLOSURE OF INVENTION

Problem to be Solved by the Invention

It is an object of the present invention to provide a method of producing an optical fiber preform, in which method it is possible to synthesize and deposit glass at a high rate by the inside CVD method using a plasma burner as a heat source in a manner such that unconsolidated portions or bubbles are little generated in the optical fiber preform.

Means for Solving the Problem

In order to achieve the object, the present invention provides a method of producing an optical fiber preform, the method including a step of depositing a glass film on the inner wall surface of a starting pipe, the wall thickness of which is d (mm), by heating from the outer circumferential surface of the pipe so as to oxidize a glass raw material while a gas containing the glass raw material is introduced into the pipe, the plasma burner being moved in parallel with the axis of the pipe, wherein in the deposition step, the temperature is controlled not to exceed $(1800+100 \times d)°$ C., a temperature of $(1100+100 \times d)°$ C. or higher being continued for 20 seconds or more at each point of the starting pipe.

In the deposition step of this method, preferably, the gas containing the glass raw material includes silicon tetrachloride at 7 g/min or more and oxygen gas at 4 l/min or more, and the traverse speed of the plasma burner is 100 mm/min or more relative to the starting pipe. In this case, the deposition rate of the glass film may be 1.3 g/min or more. Also, in a region where plasma is formed by inductive coupling, the inner diameter of the plasma burner is preferably 80 mm or more.

In another aspect of the present invention, there is provided a method for producing an optical fiber preform, the method including a step of heating a starting pipe from the peripheral surface thereof with a plasma burner while introducing a gas containing a glass raw material into the pipe to oxidize the glass raw material and deposit a glass film on the inner wall surface of the pipe, the plasma burner being moved in parallel with the axis of the pipe, wherein the plasma burner includes at least two inlets for gases for forming plasma and has an inner diameter of 80 mm or more in a region where the plasma is formed, and the deposition is conducted in a manner to satisfy the relationship, 150 mm/second<Q/S<600 mm/second, wherein Q is the total flow rate of the gases introduced into the burner, and S is the sectional area in the region in which the plasma is formed.

In the deposition step of this method, a gas containing polyatomic molecules may be introduced from at least one of the at least two gas inlets. The mixing ratio or flow rate of the gas to be introduced from each of the at least two inlets may be controlled so that the starting pipe has a desired temperature distribution.

Advantage of the Invention

In order to suppress an increase in the temperature of a starting pipe, a plasma burner having an inner diameter which is larger than that of a conventional plasma burner is used for widening the heating width, and a gas flow rate in the burner is controlled in a predetermined range. Therefore, it is possible to produce a glass preform in which unconsolidated portions or bubbles are decreased, and moreover it is possible to synthesize and deposit glass at a high rate, thereby improving productivity.

BEST MODE FOR CARRYING OUT THE INVENTION

Embodiments of the present invention will be descried below with reference to the drawings. The drawings are intended to describe the invention, and not to limit the scope of the invention. In the drawings, the same portions are denoted by the same reference numerals in order to avoid duplication of description. In the drawings, a dimensional ratio is not necessarily exact.

FIG. 1 is a conceptual view illustrating an inside CVD method. In producing an optical fiber preform by the inside CVD method, a raw material gas 2 such as a gas of $SiCl_4$, $GeCl_4$, or the like is introduced into a starting pipe 1 held at both ends thereof. At the same time, a plasma burner 3 disposed at a certain distance from the starting pipe 1 is reciprocated in parallel with the starting pipe 1 while the starting pipe 1 is rotated around the axis thereof. The plasma burner 3 may be fixed while the starting pipe 1 is moved, or both may be moved in opposite directions. By moving the plasma burner 3, the starting pipe 1 is heated from the peripheral surface thereof sequentially in the direction of movement of the plasma burner 3. As a result, the raw material gas 2 flowing in the starting pipe 1 is oxidized or hydrolyzed to form glass particles. The glass particles are sequentially deposited to form a glass film 4 on the inner wall surface of the starting pipe 1 in accordance with the movement of the plasma burner 3.

FIG. 2 is a conceptual view illustrating a plasma burner according to an embodiment of the present invention. The plasma burner 3 has an insulative cylindrical body including glass pipes in which a central inlet 7, a peripheral inlet 8, and sheath gas inlets 9 are concentrically disposed. A plasma gas 5 is introduced from each of the inlets disposed at one end of the insulative cylindrical body, and a radio-frequency current is supplied to a coil 6 wound on the peripheral surface near the other end. Consequently, a plasma fireball is produced near the other end of the insulative cylindrical body.

According to confirmation obtained as a result of experiments by the inventors, in the case where a plasma burner is used for depositing a glass film on the inner wall surface of a stating pipe, the surface of the starting pipe must be controlled to be kept at a temperature in a predetermine range for a predetermined time in order to deposit a completely consolidated glass film containing substantially no bubbles. In the method of producing an optical fiber preform according to a first embodiment of the present invention, a deposition step is performed in a manner in which the inner diameter of the plasma burner 3 and the amount of the introduced raw material gas 2 are adjusted and the temperature is controlled to $(1100+100\times d)°$ C. or higher continuously for 20 seconds or more, not exceeding $(1800+100\times d)°$ C., at each point in a region of the starting pipe 1 where the glass film 4 is being deposited.

For example, when the starting pipe having a wall thickness d of 3 mm is used, it is necessary to control so that the surface temperature of the starting pipe may become 1400° C. or higher by heating for 20 seconds or more, the surface temperature of the starting pipe not exceeding 2100° C. The occurrence of bubbles can be prevented by controlling the surface temperature to $(1800+100\times d)°$ C. or lower, and the deposited glass film 4 can be completely consolidated by maintaining the temperature of $(1100+100\times d)$ ° C. or higher for 20 seconds or more. Furthermore, since the heat source used has a low flame wind pressure, the starting pipe is little deformed, as compared with the case of using a gas burner as a heat source.

Although the time in which the temperature is $(1100+100\times d)°$ C. or higher is preferably as long as possible from the viewpoint of deposition of the glass film having no bubbles, an excessively long time may cause deformation of the pipe. For example, in a case where the starting pipe had an outer diameter of 40 mm and a wall thickness of 3 mm and the traverse speed was 120 mm/min, the pipe was distorted when the heating at 1400° C. or higher was continued for 80 seconds or more. In a case where the starting pipe had an outer diameter of 38 mm and a wall thickness of 4 mm and the traverse speed was 160 mm/min, the pipe was greatly distorted when the heating at 1500° C. or higher was continued for 105 seconds.

In order to increase the deposition rate of the glass film using a plasma burner in comparison with a conventional method, it is necessary to increase the amount of the introduced glass raw material gas and to increase the traverse speed of the plasma burner 3. For example, in order to increase the deposition rate of the glass film to 1.3 g/min or more, the gas supplied in the deposition step must contain silicon tetrachloride in an amount of 7 g/min or more and oxygen gas in an amount of 4 l/min or more. For the purpose of avoiding occurrence of unconsolidation of the glass film 4 due to an excessive thickness of the deposited film, the traverse speed of the plasma burner 3 relative to the starting pipe is preferably 100 mm/min or more. It is possible to deposit, at a deposition rate of 1.3 g/min or more, a completely consolidated glass film containing substantially no bubbles by controlling the traverse speed of the plasma burner 3 to 100 mm/min or more, in addition to controlling the temperature and time of heating the surface of the starting pipe as required in the first embodiment of the invention.

Furthermore, in a region where plasma is formed by inductive coupling, the inner diameter of the plasma burner 3 is preferably 80 mm or more.

In the case of using an induction furnace or resistance furnace as the heat source, the range of conditions of heating the starting pipe differs since the time needed for the heat to reach the deposited glass film is varied because of the low absolute temperature of the heat source and the radiation heating of the starting pipe. The scope of heating conditions required in the first embodiment is a range of heating conditions that is necessary for heating the starting pipe so that the temperature of the deposited glass film may be controlled to an optimum temperature when a plasma burner is used as the heat source.

In the method of producing an optical fiber preform according to a second embodiment of the present invention, the plasma burner 3 includes at least two inlets of gases for forming plasma and the inner diameter thereof at the region where the plasma is formed is 80 mm or more, and the deposition step is performed in a manner such that the relationship, 150 mm/second<Q/S<600 mm/second is satisfied, wherein Q is the total flow rate of the gases introduced into the burner 3, and S is the sectional area at the region.

The plasma burner 3 used in the second embodiment has an inner diameter larger than that of a burner used in a conventional inside CVD method. When the nozzle diameter of the plasma burner 3 is 80 mm or more, the heating width can be made wider as compared with the conventional production method. Also, the coupling efficiency between the coil 6 and the produced plasma can be decreased, which enables decreasing the overall temperature of the plasma. In addition, the heating width can be widened without increasing the central temperature since power concentrates at the periphery of the plasma due to the skin effect. Furthermore, when the total flow rate Q of the plasma gas 5 is set relative to the sectional area S of the burner so as to satisfy the relationship, 150 mm/second<Q/S<600 mm/second, stable plasma can be obtained without allowing the fire to go out even if a burner having a nozzle diameter of 80 mm or more is used.

In the deposition step, a gas containing polyatomic molecules is preferably introduced through at least one of the at least two gas inlets. For example, by introducing diatomic molecules as the plasma gas 5, the plasma temperature can be lowered, as compared with the case of plasma using only a rare gas. As a result, the surface temperature of the starting glass 1 is easily controlled to a temperature range of $(1100+100\times d)°$ C. to $(1800+100\times d)°$ C. Furthermore, in the deposition step, the temperature of plasma formation of the gases introduced from the inlets 7 to 9 is preferably controlled by adjusting the mixing ratio or the flow rate of the gases introduced through the inlets 7 to 9 respectively so that the starting pipe may have a desired temperature distribution.

The polyatomic molecules used are at least one of nitrogen gas ($N_2$), oxygen gas ($O_2$), air, and carbon dioxide ($CO_2$). In the case of polyatomic molecules, an index of the ease of plasma formation is dissociation energy, while in the case of monatomic molecules, an index of the ease of plasma formation is ionization energy. Therefore, a plasma formation region can be arbitrarily controlled by introducing a gas containing polyatomic molecules having different dissociation energies and monatomic molecules having different ionization energies, and consequently plasma can be stably formed even using a plasma burner having a large nozzle diameter of 80 mm or more.

For example, it is recommendable to introduce a gas containing $O_2$ (dissociation energy: 5.1 eV) having low dissociation energy through the central inlet 7 and to introduce a gas containing $N_2$ (dissociation energy: 9.8 eV) having high dissociation energy through the peripheral inlet 8. Alternatively, a mixed gas of Ar and $O_2$ may be used as the plasma gas 5 in a manner such that the mixing ratio ($O_2$ flow rate/Ar flow rate) of the gas introduced through the central inlet is 0.5, and the mixing ratio of the gas introduced through the peripheral inlet 8 is 0.2. In this way, a mixed gas may be used as the plasma gas at varying mixing ratios of the mixed gas.

In the second embodiment, in order to achieve the deposition rate of 1.3 g/min or more, a gas containing $SiCl_4$ at 7 g/min or more and $O_2$ gas at 4 l/min or more is preferably introduced as the raw material gas 2 into the starting pipe 1, and the traverse speed of the plasma burner 3 is preferably 100 mm/min or more. Furthermore, in the second embodiment, when the outer surface of the starting pipe 1 is heated, the temperature of the outer surface of the starting pipe 1 and the heating time are preferably controlled to lie in the respective predetermined ranges required in the first embodiment.

EXPERIMENTAL EXAMPLE 1

A glass film was deposited on the inner wall surface of a starting pipe having a wall thickness d of 3 mm by the inside CVD method, and the temperature of the outer surface of the starting pipe 1 was measured at each point during the deposition. The burners 3 used in this example had a structure shown in FIG. 1 and the inner diameters at a region where plasma was formed were three types: 70 mm, 80 mm, and 100 mm. As for the plasma gas, a mixed gas having a ratio ($O_2$ flow rate/Ar flow rate) of 0.6 was introduced at 50 l/min through the central inlet 7, a mixed gas having a ratio ($O_2$ flow rate/Ar flow rate) of 0.5 was introduced at 50 l/min through the peripheral inlet 8, and $N_2$ gas was introduced at 15 l/min through the sheath gas inlets 9. In addition, a radio-frequency wave was supplied to the coil 6 with a frequency of 4 MHz and a power of 70 kW. Furthermore, $SiCl_4$ gas at 7 g/min and $O_2$ at 5 l/min were introduced into the starting pipe 1. The starting pipe 1 was heated with the plasma burner 3 moving at a speed of 130 mm/min.

FIG. 3 is a graph in which the temporal changes of the outer surface temperature at each point of the starting pipe 1 are shown using the inner diameter of the burner as a parameter. In this figure, the ordinate shows the outer surface temperature at each point of the starting pipe 1, and the abscissa shows the time elapsed after the outer surface temperature has become $(1100+100\times d)°$ C. or higher, i.e., 1400° C. or higher. A dotted line, a dot-and-dash line, and a solid line show the cases in which the inner diameters of the plasma burners 3 were 70 mm, 80 mm, and 100 mm, respectively.

As FIG. 3 indicates, the outer surface temperature of the starting pipe 1 could be suppressed to $(1800+100\times d)°$ C. or lower, i.e., 2100° C. or lower, with the burner 3 having any one of the inner diameters. With the plasma burner having an inner diameter of 70 mm, the time (elapsed time) in which the outer surface temperature could be maintained at 1400° C. or higher was 17 seconds, and bubbles and unconsolidated portions were observed in the resulting glass film. In the cases where the inner diameters of the plasma burners 3 were 80 mm and 100 mm, the elapsed times were increased to 22 seconds and 25 seconds, respectively. By using the plasma burner 3 having an inner diameter of 80 mm or more, the outer surface temperature of the starting pipe 1 could be maintained at $(1100+100\times d)°$ C. or higher for 20 seconds or more and suppressed to $(1800+100\times d)°$ C. or lower, whereby the glass deposited film having neither unconsolidated portions nor bubbles were obtained.

It has also been confirmed that in the case of an ordinary wall thickness of a starting pipe 1 usually used in the inside CVD method, the temporal change in the outer surface temperature of the starting pipe 1 exhibits substantially the same tendency as shown in FIG. 3 if the plasma burner 3 is moved at a speed of 100 mm/min or more.

EXPERIMENTAL EXAMPLE 2

A glass film was deposited on the inner wall surface of a starting pipe by the inside CVD method, and the relationship between the heating conditions (retention time at a predetermined temperature and the maximum outer surface temperature) and the state of the resulting glass film was examined. The burners 3 used in this example had a structure shown in FIG. 1 and the inner diameters at a region where plasma was formed were three types: 70 mm, 80 mm, and 100 mm. As for the plasma gas 5, a mixed gas at a ratio ($O_2$ flow rate/Ar flow rate) of 0.6 was introduced at 50 l/min through the central inlet 7, a mixed gas at a ratio ($O_2$ flow rate/Ar flow rate) of 0.5 was introduced at 30 l/min through the peripheral inlet 8, and $N_2$ gas was introduced at 30 l/min through the sheath gas inlets 9. The starting pipe 1 was heated by moving the plasma burner 3 at a speed of 140 mm/min. The heating conditions were controlled by changing the radio-frequency power supplied to the coil 6. The deposition rate of the glass film was 1.4 g/min.

FIGS. 4A and 4B are graphs each illustrating a preferred temperature range and heating time. FIG. 4A is a graph showing a case where a starting pipe has a wall thickness of 3 mm, and FIG. 4B is a graph showing a case where a starting pipe has a wall thickness of 4 mm. In each of the figures, the ordinate represents the maximum value (maximum outer surface temperature) of the outer surface temperature at each point of the starting pipe 1, and the abscissa represents the time in which the outer surface temperature is maintained at $(1100+100\times d)°$ C. (i.e., 14000° C. for the starting pipe having a wall thickness of 3 mm and 1500° C. for the starting pipe having a wall thickness of 4 mm) or higher at each point. In each of the figures, dotted lines show the heating conditions (retention time and maximum outer surface temperature) realized with the inner diameters of 70 mm, 85 mm, and 100 mm, respectively, of the plasma burners 3. The state of each of the glass films 4 produced under the heating conditions is shown by symbol ○ (good) or ● (poor).

With the wall thickness d of 3 mm, if the outer surface temperature is 2100° C. or lower with a retention time of 20 seconds or more, a glass film having substantially no unconsolidated portion and bubble can be obtained. Likewise, in the case of the wall thickness d of 4 mm, if the outer surface temperature is 2200° C. or lower with the retention time of 20 seconds or more, a glass film having substantially no unconsolidated portion and bubble can be obtained. Namely, in the case wherein the wall thickness of the starting pipe 1 is d (mm), a glass film having substantially no unconsolidated portion and bubble can be obtained by satisfying the conditions in which the outer surface temperature is $(1800+100\times d)°$ C. or lower, and the heating time of the outer surface at $(1100+100\times d)°$ C. or higher is 20 seconds or more.

When the plasma burner having an inner diameter of 70 mm is used, there is no heating region satisfying the above-descried conditions. On the other hand, when the plasma burner 3 having an inner diameter of 85 mm or 100 mm, i.e., 80 mm or more, is used, there is a region in which the conditions can be satisfied, thereby enabling the production of a glass film having neither unconsolidated portion nor bubble. In other words, with a burner having an inner diameter of 70 mm, it is difficult to obtain a satisfactory film. With a burner having an inner diameter of 85 mm, a film having neither bubble nor unconsolidated portion can be produced with an inside deposition method. With a burner having an inner diameter of 100 mm, it is possible to widen a region in which a satisfactory film having neither bubble nor unconsolidated portion can be obtained and to perform more stable deposition of a glass film with the inside deposition method.

EXPERIMENTAL EXAMPLE 3

The influence of a plasma gas on the outer surface temperature at each point of a starting pipe was measured. The plasma burner used had an inner diameter of 100 mm in a region in which plasma was formed. A starting pipe 1 had a wall thickness d of 3 mm, the traverse speed of the plasma burner 3 was 140 mm/min, and the power supplied to the coil 6 was 65 kW. FIG. 5 is a graph in which the temporal changes of the outer surface temperature at each point of the starting pipe 1 are shown using the plasma gas as a parameter. In the figure, the ordinate shows the outer surface temperature at each point of the starting pipe 1, and the abscissa shows the time elapsed after the outer surface temperature has become $(1100+100\times d)°$ C. or higher, i.e., 1400° C. or higher.

Curve (i) shows a case in which a mixed gas at a ratio ($O_2$ flow rate/Ar flow rate) of 0.3 was introduced at 50 l/min through the central inlet 7, a mixed gas at a ratio ($O_2$ flow rate/Ar flow rate) of 0.9 was introduced at 30 l/min through the peripheral inlet 8, and $N_2$ gas was introduced at 30 l/min through the sheath gas inlets 9. In this case, the temperature of the outer surface of the starting pipe reached 1950° C. at its maximum, and the heating time at 1400° C. or higher was 20 seconds.

Although a glass film with no bubbles can be obtained under the above-described conditions, for the purpose of achieving a higher deposition rate, it is preferable that the outer surface of the starting pipe have a lower temperature and that the heating time at 1400° C. or higher be longer. Curve (ii) shows a case in which a mixed gas at a ratio ($O_2$ flow rate/Ar flow rate) of 3 was introduced at 50 l/min through the central inlet 7, a mixed gas at a ratio ($O_2$ flow rate/Ar flow rate) of 1.5 was introduced at 30 l/min through the peripheral inlet 8, and $N_2$ gas was introduced at 30 l/min through the sheath gas inlets 9. In this case, the temperature of the outer surface of the starting pipe at its maximum can be lowered to 1850° C., and the heating time at 1400° C. can be made 24 seconds.

EXAMPLES

Example 1

A plasma burner 3 having the structure shown in FIG. 1 in which a plasma generation part had an inner diameter of 100 mm was used. As for a plasma gas, a mixed gas at a ratio ($O_2$ flow rate/Ar flow rate) of 0.6 was introduced at 50 l/min through the central inlet 7, a mixed gas at a ratio ($O_2$ flow rate/Ar flow rate) of 0.5 was introduced at 50 l/min through the peripheral inlet 8, and $N_2$ gas was introduced at 15 l/min through the sheath gas inlets 9. A radio-frequency wave at a frequency of 4 MHz and a power of 70 kW was supplied to the coil 6. Also, $SiCl_4$ gas at 7 g/min and $O_2$ at 5 l/min were introduced into the starting pipe 1 having a wall thickness of 3 mm while the starting pipe 1 was rotated around the axis thereof. The starting pipe 1 was heated by moving the plasma burner 3 at a speed of 140 mm/min to deposit a glass film at a rate of 1.4 g/min on the inner wall surface of the starting pipe 1. During the deposition, the maximum outer surface temperature of the starting glass 1 was 2000° C., and the time in which the outer surface temperature was maintained at 1400° C. or higher was 25 seconds. As a result, neither bubble nor unconsolidated portion was observed in the resulting glass film.

Comparative Example 1

A glass film was deposited at a rate of 1.4 g/min on the inner surface of a starting pipe 1 in the same manner as in EXAMPLE 1 except that the plasma generation part of a plasma burner 3 having the structure shown in FIG. 1 had an inner diameter of 70 mm. During the deposition, the maximum outer surface temperature of the starting glass 1 was 2150° C., and the time in which the outer surface temperature was maintained at 1400° C. or higher was 19 seconds. As a result, bubbles and an unconsolidated portion were observed in the resulting glass film.

Example 2

A plasma burner 3 having the structure shown in FIG. 1 and having a plasma generation part of 100 mm in inner diameter was used. As for a plasma gas, a mixed gas at a ratio ($O_2$ flow rate/Ar flow rate) of 0.6 was introduced at 50 l/min through the central inlet 7, a mixed gas at a ratio ($O_2$ flow rate/Ar flow rate) of 0.5 was introduced at 30 l/min through the peripheral inlet 8, and $N_2$ gas was introduced at 30 l/min through the sheath gas inlets 9. In this case, (total flow rate Q of gases)/(inner diameter S of plasma generation part of burner 3) was about 233 mm/sec. A radio-frequency wave having a frequency of 4 MHz and a power of 70 kW was supplied to the coil 6 to generate plasma, and consequently a stable plasma flame was obtained.

Comparative Example 2

Unlike EXAMPLE 2, for the purpose of a plasma gas 5, a mixed gas at a ratio ($O_2$ flow rate/Ar flow rate) of 0.6 was introduced at 30 l/min through the central inlet 7, a mixed gas at a ratio ($O_2$ flow rate/Ar flow rate) of 0.5 was introduced at 15 l/min through the peripheral inlet 8, and $N_2$ gas was introduced at 15 l/min through the sheath gas inlets 9. In this case, the Q/S ratio was about 127 mm/sec. The other conditions were the same as in EXAMPLE 2. As a result, a plasma flame flowed back in the burner, causing a failure to heat the starting pipe.

Comparative Example 3

Unlike EXAMPLE 2, for the purpose of a plasma gas 5, a mixed gas at a ratio ($O_2$ flow rate/Ar flow rate) of 0.6 was introduced at 150 l/min through the central inlet 7, a mixed gas at a ratio ($O_2$ flow rate/Ar flow rate) of 0.5 was introduced at 70 l/min through the peripheral inlet 8, and $N_2$ gas was introduced at 70 l/min through the sheath gas inlets 9. In this case, the Q/S ratio was about 127. The other conditions were the same as in EXAMPLE 2. As a result, a plasma flame became unstable, causing the problem of the plasma flame going out.

The disclosure in the specification, claims, drawings, and abstract of Japanese Patent Application No. 2004-315900 (filed on Oct. 29, 2004) is incorporated in this specification in its entirety.

INDUSTRIAL APPLICABILITY

The present invention makes it possible to produce a glass preform in which unconsolidated portions and bubbles little exist and to synthesize and deposit glass at a high rate, thereby improving productivity.

BRIEF DESCRIPTION OF THE DRAWINGS

FIG. 4A shows a case where a starting pipe has a wall thickness of 3 mm, and FIG. 4B shows a case where a starting pipe has a wall thickness of 4 mm.

Figure 1:
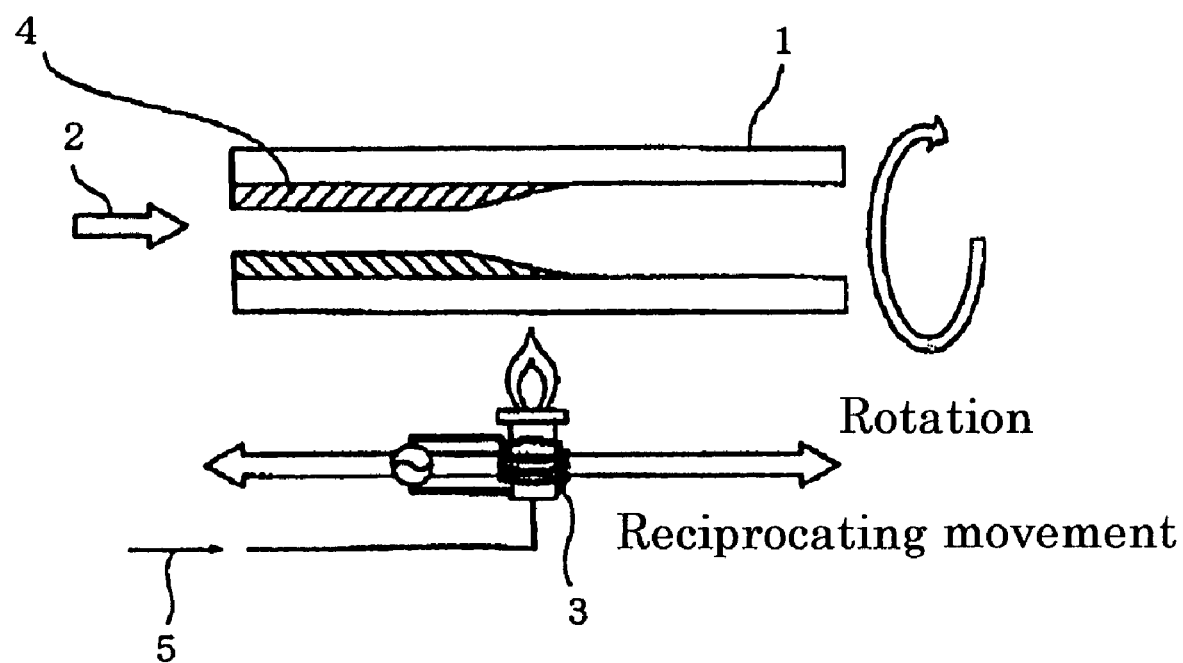
FIG. 1 is a conceptual view illustrating an inside CVD method.
Figure 2:
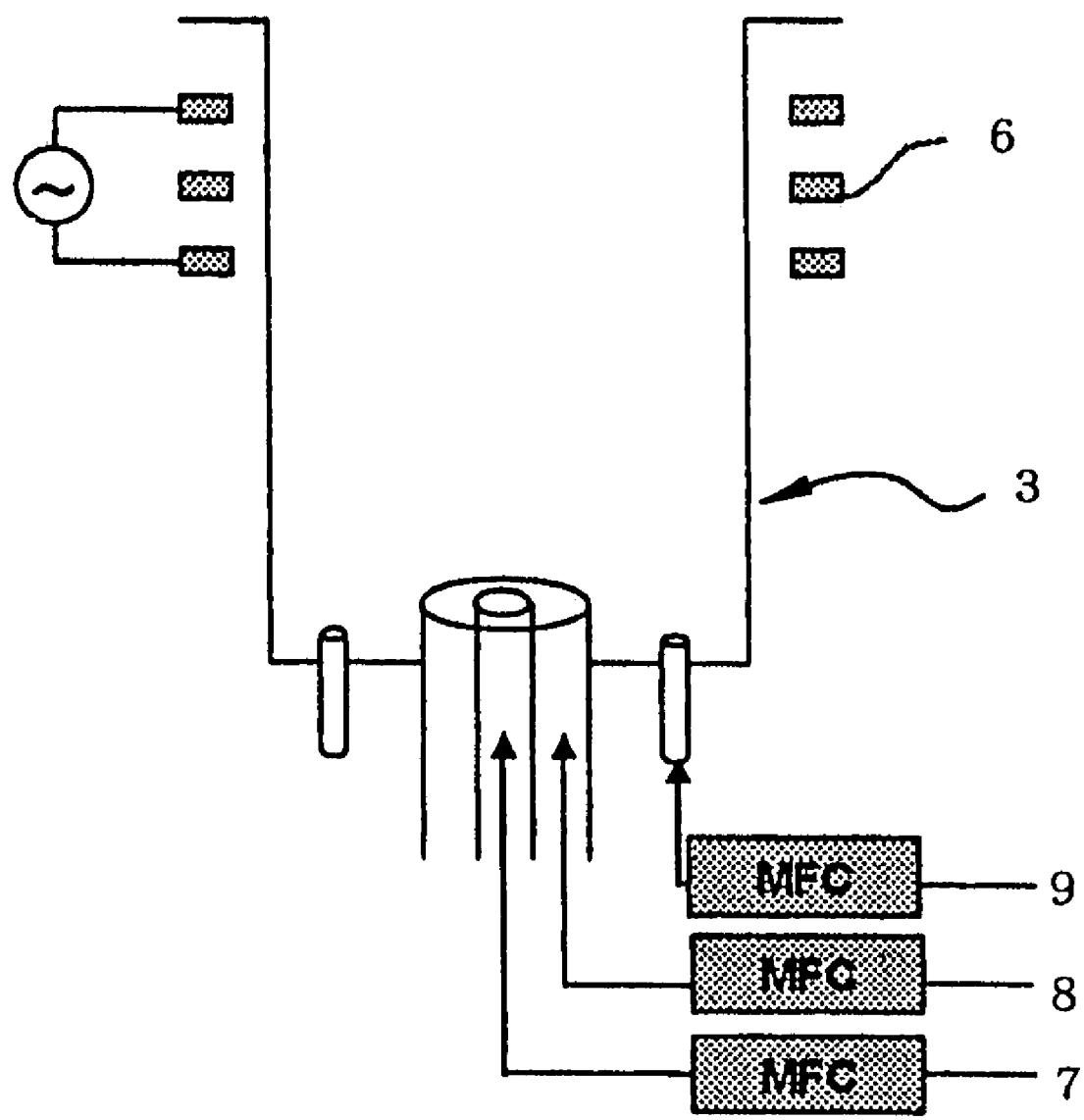
FIG. 2 is a conceptual view illustrating a plasma burner according to an embodiment of the present invention.
Figure 3:
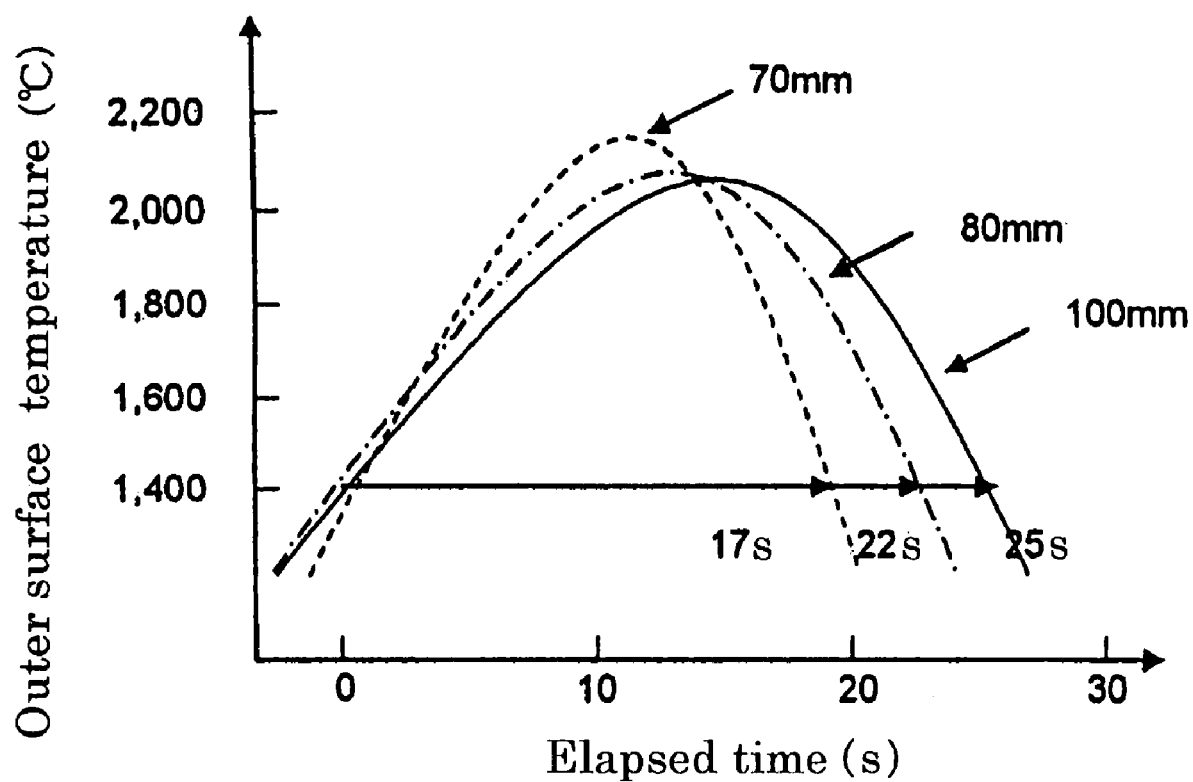
FIG. 3 is a graph showing temporal changes of the outer surface temperature at each point of a starting pipe. In the graph, the inner diameter of a burner is used as a parameter.
Figure 4A:
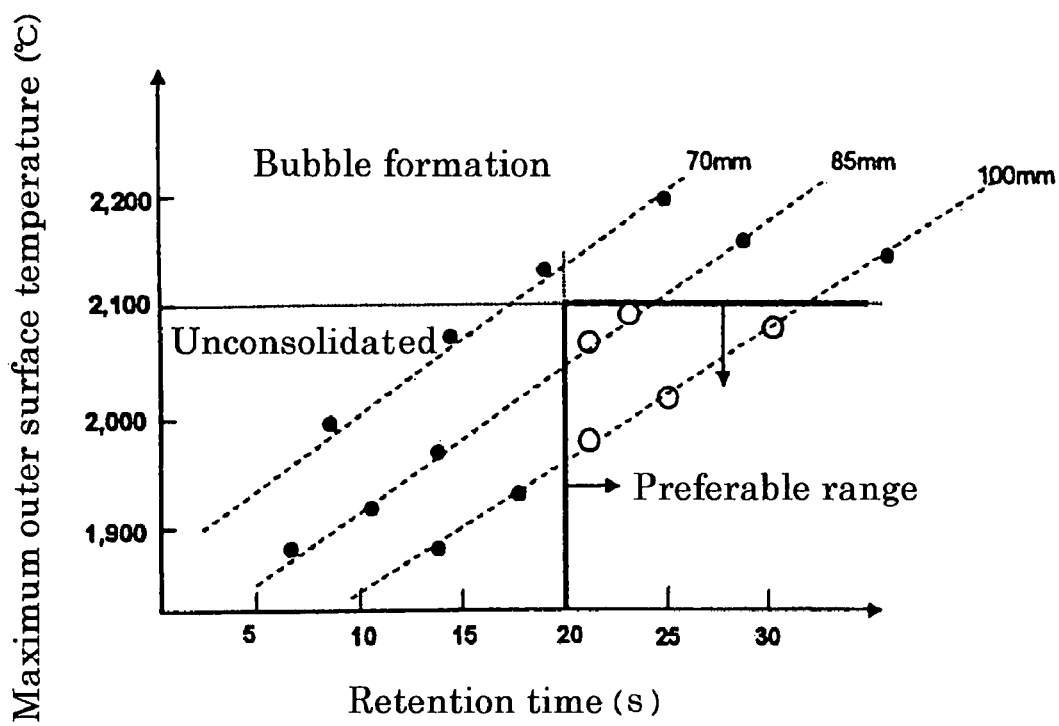
FIGS. 4A and 4B are graphs showing a preferred temperature range and heating time.
Figure 4B:
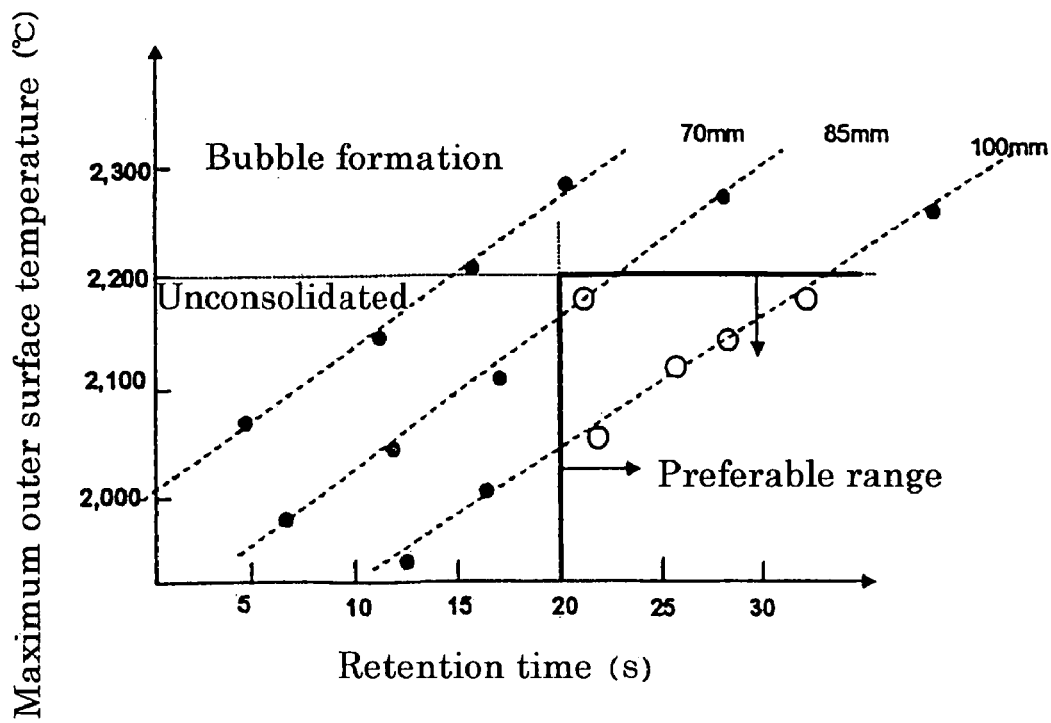
Figure 5:
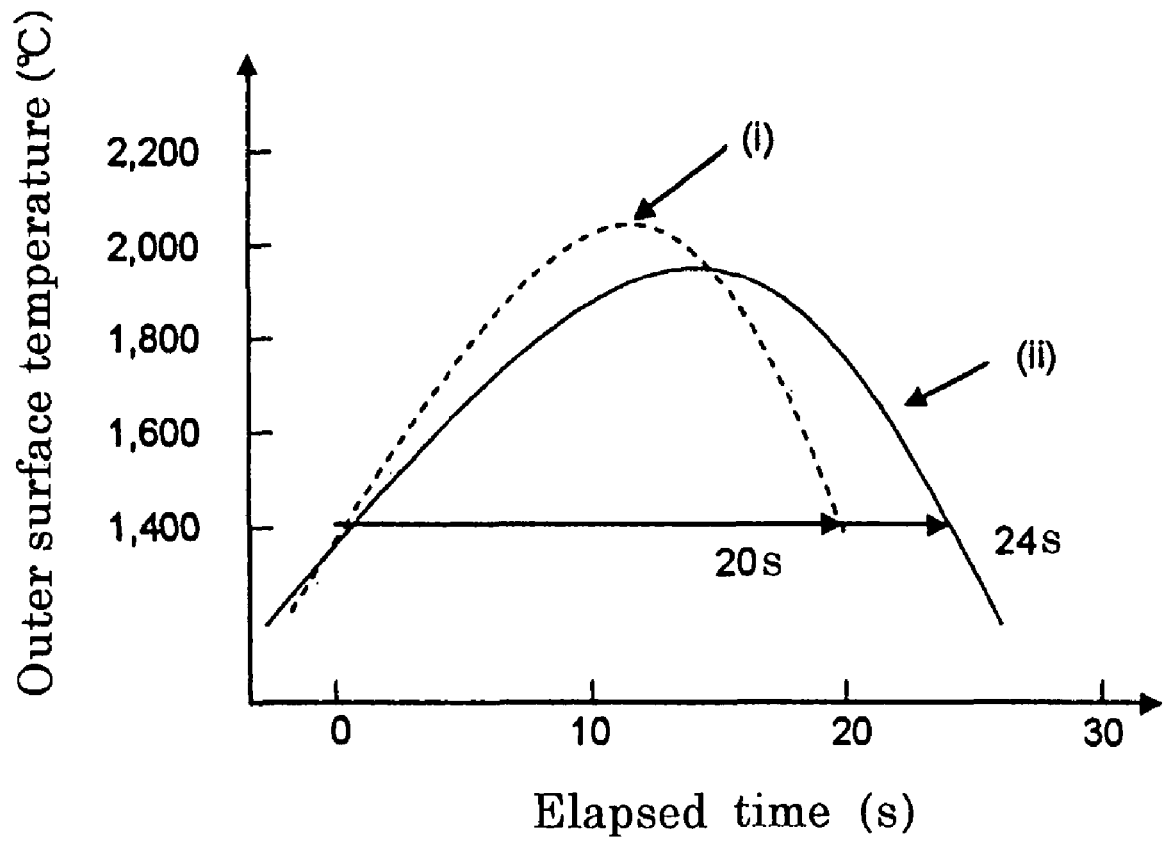
FIG. 5 is a graph showing temporal changes of the outer surface temperature at each point of a starting pipe 1. In the graph, the plasma gas is used as a parameter.

REFERENCE NUMERAL 1 starting pipe, 2 raw material gas, 3 plasma burner, 4 glass film, 5 plasma gas, 6 coil, 7 central inlet, 8 peripheral inlet, 9 sheath gas inlet

The invention claimed is:

1. A method of producing an optical fiber preform, the method comprising a step of
    depositing a glass film on the inner wall surface of a starting pipe by heating the starting pipe from the outer circumferential surface thereof with a plasma burner so as to oxidize a glass raw material and deposit a glass film on the inner wall surface of the pipe while introducing a gas containing the glass raw material into the pipe, the plasma burner being moved in parallel with the axis of the pipe;
    wherein the plasma burner includes at least two inlets of gases for forming plasma and the inner diameter thereof at the region where the plasma is formed is 80 mm or more, and
    the deposition step is performed in a manner such that the relationship, 150 mm/second <Q/S <600 mm/second is satisfied, wherein Q is the total flow rate of the gases introduced into the burner, and S is the sectional area at the region.
2. A method of making an optical fiber preform according to claim 1,
    wherein in the deposition step, a gas containing polyatomic molecules is introduced from at least one of the at least two gas inlets.
3. A method of making an optical fiber preform according to claim 1,
    wherein the mixing ratio or flow rate of the gas to be introduced from each of the at least two inlets is controlled so that the starting pipe may have a desired temperature distribution.

* * * * *